UNITED STATES PATENT OFFICE.

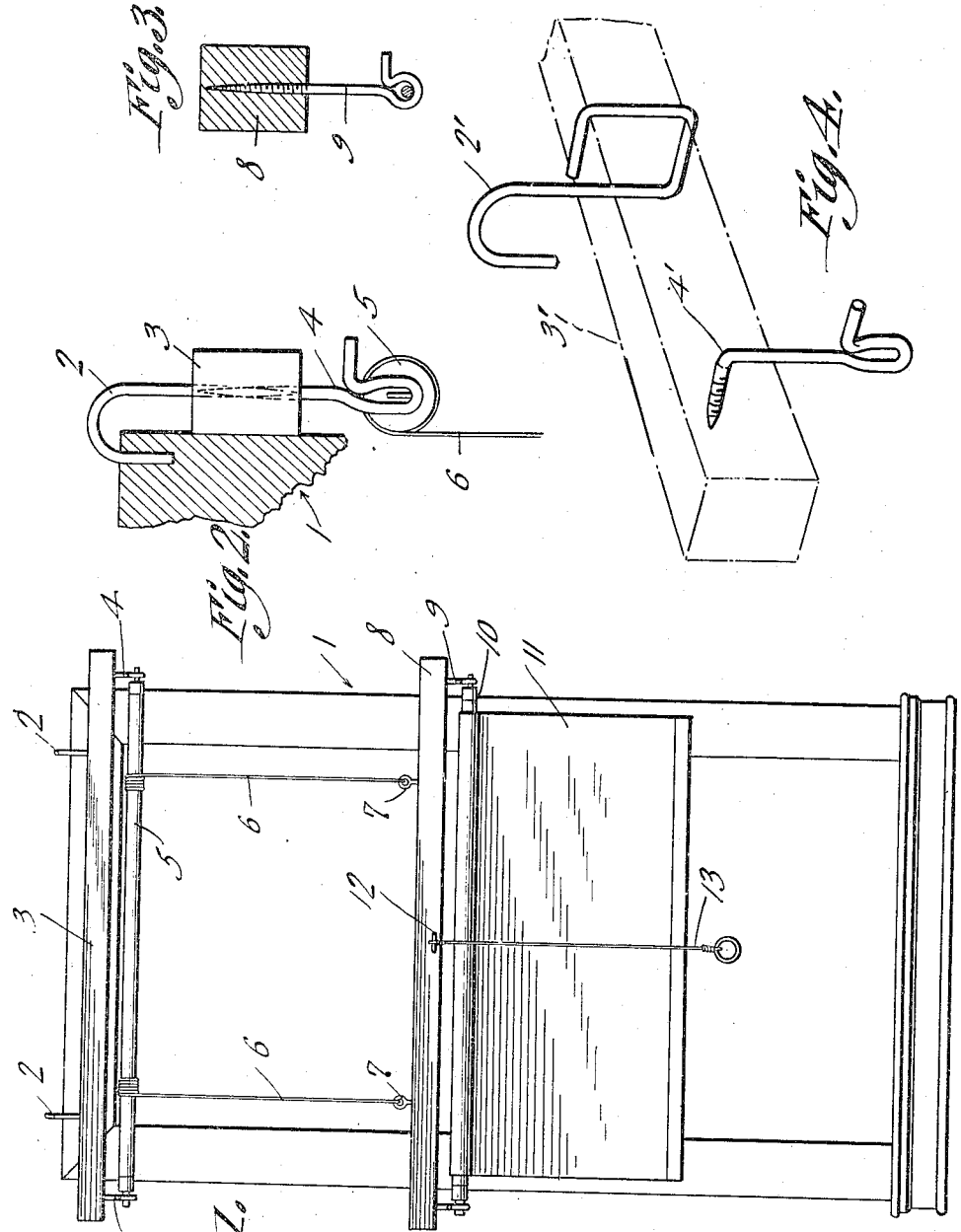

JOHN THOMAS LOMAX, OF HOXIE, ARKANSAS.

ADJUSTABLE SHADE-HANGER.

1,289,836.  Specification of Letters Patent.  Patented Dec. 31, 1918.

Application filed March 11, 1918. Serial No. 221,802.

*To all whom it may concern:*

Be it known that I, JOHN T. LOMAX, a citizen of the United States, residing at Hoxie, in the county of Lawrence and State of Arkansas, have invented a new and useful Adjustable Shade-Hanger, of which the following is a specification.

The subject of this invention is an adjustable shade support of that character which permits of vertical adjustment of the shade to any desired position on the window.

The invention contemplates the provision of means for hanging the support from a window frame.

A still further object within the contemplation of the invention is the provision of means for hanging the shade support from a main support.

The invention also contemplates the production of a simple, durable and efficient shade hanger.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in front elevation of a hanger constructed in accordance with the invention and shown in place on a window frame;

Fig. 2 is an enlarged fragmentary view in end elevation, partly in section, of the main hanger bar;

Fig. 3 is an enlarged detail view in transverse section of the shade hanger bar, the section taken at one of the hanger brackets;

Fig. 4 is a fragmentary view in perspective of a modified form of main hanger bar.

An ordinary window frame is shown generally at 1 and the upper cross bar of the frame is provided with recesses or sockets extending downwardly into the bar from the upper edge thereof.

In carrying out the invention hooks 2, herein shown as screw hooks, have their hook ends inserted in the recesses or sockets and these hooks are screwed into or otherwise support a horizontally disposed bar 3 which extends transversely of the window frame. Brackets 4 are secured to and depend from the bar 3 and serve to support the usual spring rewound shade roller 5.

Cords or cables 6 are secured to the roller 5, upon which they are windable, and the depending ends of these cords or cables 6 are secured to eyes 7 which are attached to and rise from the adjustable shade supporting bar 8 which is disposed horizontally and extends transversely of the window frame. Brackets 9 are secured to and depend from the bar 8 and form a support for the shade roller 10 upon which is windable a shade 11. An eye or similar fastener 12 may be provided on the bar 8 and from this eye may depend a cord 13 which is in position to be easily grasped for the purpose of raising or lowering the adjustable shade supporting bar 8, and so position the shade as desired upon the window.

A modified form of the main hanger bar 3 is shown in Fig. 4 in which the hooks 2' are looped about the bar 3', and the hanger brackets 4' are substantially L-shaped and straddle the bar 3'.

It is thought that the operation of the device will be amply understood from the foregoing description without a special and extended explanation thereof.

It will also be readily apparent that the shade roller 5 may have the usual shade attached thereto instead of the adjustable shade bracket herein shown, thus making the upper structure a shade support.

Having thus described the invention, what is claimed as new and sought by Letters Patent, is:—

1. An adjustable shade support, including a main hanger bar extending transversely of a window frame, hooks secured to the hanger bar and having their hooked ends adapted to be inserted into recesses provided in the upper bar of the window frame, brackets depending from the main hanger bar, a spring rewound roller supported by the brackets, cords secured to the roller and depending therefrom, a horizontally disposed shade hanger bar hung from the cords, brackets depending from the shade hanger bar, a shade roller supported by the brackets, and a cord for raising or lowering the shade hanger bar.

2. An adjustable shade support, including a main hanger bar extending transversely of a window frame, hooks secured to the hanger bar and having their hooked ends adapted to be inserted into recesses provided in the upper bar of the window frame, an adjustable shade support carried by the hanger bar, means for adjusting the support, and a shade secured to the support.

In testimony that I claim the foregoing as my own, I have hereto affixed my signature in the presence of two witnesses.

JOHN THOMAS LOMAX.

Witnesses:
J. E. PRINGLE, Sr.,
J. W. ABBOTT.